(12) United States Patent
Shen

(10) Patent No.: US 11,622,623 B2
(45) Date of Patent: Apr. 11, 2023

(54) DIGITAL TEACHING STATION

(71) Applicant: Pathway Innovations and Technologies, Inc., San Diego, CA (US)

(72) Inventor: Ji Shen, San Diego, CA (US)

(*) Notice: Subject to any disclaimer, the term of this patent is extended or adjusted under 35 U.S.C. 154(b) by 0 days.

(21) Appl. No.: 17/510,358

(22) Filed: Oct. 25, 2021

(65) Prior Publication Data

US 2022/0039550 A1 Feb. 10, 2022

Related U.S. Application Data

(63) Continuation-in-part of application No. 16/451,000, filed on Jun. 24, 2019.

(60) Provisional application No. 63/105,172, filed on Oct. 23, 2020.

(51) Int. Cl.
*A47B 19/10* (2006.01)
*G06F 1/16* (2006.01)
*G06F 3/14* (2006.01)

(52) U.S. Cl.
CPC ............ *A47B 19/10* (2013.01); *G06F 1/1632* (2013.01); *G06F 3/1454* (2013.01); *A47B 2200/008* (2013.01)

(58) Field of Classification Search
CPC ................ A47B 21/02; A47B 21/0371; A47B 2021/0392; A47B 2021/066; A47B 2200/0066; A47B 19/10; A47B 2200/008; G06F 3/0488; G06F 21/6272; G06F 1/1632; G06F 3/1454; G06V 10/22
See application file for complete search history.

(56) References Cited

U.S. PATENT DOCUMENTS

| | | | | |
|---|---|---|---|---|
| 2006/0225627 A1* | 10/2006 | Heidmann | ........... | A47B 96/205 108/161 |
| 2009/0154079 A1* | 6/2009 | Bae | ........................ | G06F 1/1632 108/50.11 |
| 2009/0307843 A1* | 12/2009 | Hookway | ............. | A47B 23/046 108/106 |
| 2010/0250789 A1* | 9/2010 | Collopy | .............. | G06F 11/1451 710/13 |
| 2017/0235535 A1* | 8/2017 | Shen | .................. | H04N 1/00267 345/173 |

* cited by examiner

*Primary Examiner* — Matthew W Ing

(57) ABSTRACT

An improved digital teaching station, a stand, and a platform that supports a central multitouch flat-panel display screen is provided. A reflective glass mirror is affixed on top of the stand, and a computing device is connected. Moreover, a document camera is attached to a side tray. Furthermore, hardware and software enables a separate video stream to create always upright content from an upward facing electronic display screen and to interconnect with all devices and data types.

18 Claims, 6 Drawing Sheets

DIGITAL TEACHING STATION

CROSS-REFERENCE TO RELATED APPLICATION

This application claims priority to U.S. Provisional Patent Application No. 63/105,172, filed on Oct. 23, 2021, entitled "Digital Working Station," and is a continuation-in-part of U.S. patent application Ser. No. 16/451,000, filed on Jun. 24, 2019, entitled "Digital Working Station," the entire disclosures of which are incorporated by reference herein.

BACKGROUND OF THE INVENTION

1. Field of Invention

The present invention relates to interactive educational tools, and more specifically, to a digital teaching station.

2. Description of Related Art

Today's students are growing up in a technology-rich environment. Schools are turning to interactive learning to inspire students and bolster teacher-student relationships. Further, businesses are relying on technology to enhance the exchange of ideas. There is very little interaction when a person is giving a presentation or a lecture with a traditional whiteboard or chalkboard as their back is to the audience. Important points may be lost, and listeners may be easily distracted.

Touch screen displays are becoming increasingly ubiquitous in the modem classroom and business settings. Today's classrooms have progressed from blackboard and whiteboard presentations to presentations from a computer-driven teaching station where the teaching station is connected to a larger display that the audience views. Unfortunately, traditional teaching stations are often cumbersome and limited in applications.

A podium, lectern, or pulpit is a commonly used stage, teaching station, or stand for speakers to deliver presentations or speeches. Certain podiums, high-tech podiums, smart podiums, or teaching stations can feature circuitry to connect computers or teleprompters.

Traditionally, teaching stations are fixed and have many different cables protruding from the teaching station. This configuration, while functional, can be problematic within the confines of a classroom or boardroom. Further, teaching stations cannot easily connect to another computing device. For example, connecting a personal computer to a teaching station requires special software or unique electrical connection ports. The setup process can be long and inefficient.

Electronic switches, switching systems, and bridges are operated using a processor or computer that controls switching timings to filter, aggregate, and manage data. The instructions are programmed and stored on a processor or computer that controls the operations. The desired results can be achieved by using a bridge or switch device depending on the objective. More specifically, bridges are generally software-based and limited in ports, whereas switches are hardware-based and encompass an assortment of ports. Moreover, specific switching schemes have a dedicated path. For example, audio and video switching devices used during presentations only provide input and output signal content types in a fixed format. They are limited to a few standard audio and video formats.

Current switching devices do not provide a system to manage or distribute advanced and complex digital content varieties. More recent digital content that is not currently supported includes Human Interface Device ("HID") events, such as mouse, keyboard, multitouch screen, or whiteboard events, USB Video Class ("UVC") video streams or USB Audio Class ("UAC") audio streams, and USB Mass Storage Class file exchanges. Switches do not allow the system to send the aforementioned data types over a USB connection. They only allow for input and output that are one-directional or unidirectional, meaning the switching is from simple input to simple output. Other switching devices on the receiving end are limited to audio and video playback, for example, speakers or a television display. Therefore, switching systems are missing a bi-directional or multi-directional distribution of signals.

Additionally, the number of input and outport ports is fixed. Input and output connectors are limited to traditional audio and video types to include existing technologies such as Hi-Definition Multimedia Interface ("HDMI"), S-video, optical ports, auxiliary inputs, component video, component audio, composite video, audio headphone jack, X Connector, Locking Connector, Rubber Boot ("XLR") microphone connector, and other traditional audio and video signals. Devices thus do not readily support nor contain USB 2.0, USB 3.0, and USB 3.1 Type C connectors.

Managing, aggregating, or bridging the content distributed from input to output on bridge devices is predetermined and processed by dedicated special-purpose micro-processors, such as Field-Programmable Gate Arrays ("FPGA") or Application-Specific Integrated Circuits ("ASIC") based special-purpose chips. Small LED displays are used to select the input source and output source ports for bridges to manage content. However, it is difficult and complex to enable more flexible distribution functions, such as issuing control commands to a terminal device to achieve a real-time interaction between devices. The functions must first go through a protocol that includes a serial port and demand vendors determine what hardware level to implement. Generally, it is often time-consuming, error-prone, and requires highly specialized knowledge to implement other more flexible or advanced content. Thus, wireless audio, video, and USB signals are not managed.

A teleprompter, autocue, glass teleprompter, or presidential teleprompter is a frequently used display device that prompts speakers with a visual script. Podiums and teleprompters assist in presentations, speeches, or other speaking events, from classroom lectures to presidential speeches. Most teleprompters cannot function through the use of existing switching or bridge devices.

Meanwhile, typical glass teleprompters include a prompter or monitor hidden in the base of a stand. The monitor displays text, which is reflected on a glass mirror mounted on top of the stand. The mirror shows the reflected text from the upward-facing monitor at the base. The mounted mirror is generally a one-way mirror affixed at a 45-degree angle. Therefore, the audience does not see the text, while the speaker only views the script. A goal of the presidential teleprompter is to have the speaker read the text while also delivering a speech to the audience without the audience being aware of the text or without the speaker looking away from the audience. Using the standard glass teleprompter makes it possible for speakers to appear as though they are looking directly at the audience through clear glass.

Consequently, teleprompters require the monitor at the base of the stand to display the image, text, or script upside down for the mirror to reflect and show a non-upside-down image to the speaker. However, when the speaker desires to show an audience the same image that the speaker views on the teleprompter glass, teleprompters only allow the image to be mirrored and upside down. The speaker must look downward at the monitor housed within the stand's base and not through the glass to combat this. Therefore, the goal of looking directly at the audience is defeated. Further, the glass teleprompter does not provide any means to set up a display system using a physical text or script that the speaker follows. It is impossible to place a piece of paper on the mirror because it is tilted at a 45-degree angle and would also defeat the benefit of allowing the audience to achieve an unobstructed view of the speaker.

Furthermore, podiums and teaching stations are very large because of the electronic components and storage spaces. These electronically enabled podiums are only placed in large presentation rooms with copious space. Further, when speaking, there are no capabilities to look directly at the audience in the same way as using the aforementioned glass or presidential teleprompters. The speaker has to look down at the computer housed within the large podium, again defeating the purpose of looking directly at an audience.

Current smart devices and other technologies are interconnecting wirelessly, and existing switching, bridging, or managing devices do not allow wireless interconnectivity. Smart mobile devices, PCs, and various special-purpose devices such as interactive flat panels and interactive whiteboards are increasing in popularity and becoming more widespread. These technologies interconnect to deliver an increasing number of data types. These include video conferencing meetings with a shared whiteboard or shared touch panels, keynote speeches in an auditorium with interactive activities, in-classroom or distance learning environments, USB interface carried multiple data types, and USB connectors along with traditional A/V interfaces. Thus, there exists a need for a central hub or interactive flat-panel display screen that acts as a digital podium and connects teleprompters and video capture devices such as document cameras while serving as a multi-directional electronic switching device.

SUMMARY OF THE INVENTION

The present invention overcomes these and other deficiencies of the prior art by providing a teaching station with a central interactive flat-panel display screen that interconnects all devices, whether smart or dumb types, using multi-directional switching and transmitting various data types through USB interfaces. The teaching station can include an optional teleprompter where a user presents to an audience while maintaining eye contact and an optional document camera to share a video of a document or other objects in real-time while presenting.

Significant benefits compared to other teaching stations include acting as a digital full-duplex-capable switcher. It aggregates, manages, and distributes signals to and from smart or simple type devices. These devices include but are not limited to PCs, smart mobile devices, interactive display terminals, standard audio/video equipment, and human interface devices.

Advantageously, the digital teaching station is fully modular. Meaning, each element of the digital teaching station is detachable, including the central interactive flat-panel display screen. Because all attachments are modular, repairs can be performed remotely, more efficiently, and less expensively because only one modular part would need to be repaired. Another advantage of the modular features is that the digital teaching station has an extendable tray and dock for a computing device. Any laptop or other similar smart device can be attached, allowing flexibility when a computing device is connected. There are no limitations or requirements for the digital teaching station to run.

Another benefit is the inclusion of Open Pluggable Specification ("OPS") slots or holders for increased functionality to connect any desired device. An optional document camera allows a user to use the teaching station to show what is being displayed in real-time to an audience and is advantageous because, during presentations, a user often desires to show an audience a document or other selected demonstrative while speaking.

In an embodiment of the invention, a digital teaching station device comprises a stand and a platform, wherein a central interactive flat-panel display screen is housed. The digital teaching station has various ports and connectors to connect an optional teleprompter and document camera. The digital teaching station displays an always upright or non-manipulated image through separate video output ports. Thus, the digital teaching station allows a speaker to deliver a speech while showing the audience an upright image on a separate display.

Moreover, the detachable central interactive flat-panel display screen houses various ports and connectors to support new data types, including HDMI and USB C ports. The central interactive flat-panel display screen acts as a bridge or switch, which advantageously allows a user to use the interactive flat-panel display screen as a personal computing device screen extender and increases a personal computer's functionality. The central interactive flat-panel display screen also bridges all connected devices' video, audio, and touch screen events. Thus, allowing a user to present while also controlling what is being displayed during a presentation. An optional teleprompter can be modularly attached. Because of the central interactive flat-panel display screen, a user can use the teleprompter without looking down at a computer and presenting while directly looking at an audience.

In an embodiment of the invention, the digital teaching station encompasses a computing device having connectors; a platform having a means of connecting to at least one computing device; the means of connecting having an HDMI/USB/antenna input or output, or any combination thereof; a stand which is telescopic and capable of omnidirectional motion; a battery pack disposed beneath the platform enabling a wireless work station; and at least one adapter for the at least one personal computing device. In certain embodiments, the digital teaching station comprises a coded lock compartment to secure a computing device's hardware or a memory board. The personal computing device can be selected from a non-limiting group, including a tablet, laptop, document camera, iPad, Android, iPhone, or any other telecommunication device, etc. The digital teaching station wirelessly sends and receives multiple touch signals between any touch-enabled laptop/tablet and touch-enabled interactive displays, such as an interactive whiteboard.

The foregoing and other features and advantages of the present invention will be apparent from the following, more particular description of the preferred embodiments of the present invention and the accompanying drawings.

BRIEF DESCRIPTION OF THE DRAWINGS

For a complete understanding of the present invention and its advantages, reference is now made to the ensuing descriptions taken in connection with the accompanying drawings briefly described as follows.

DETAILED DESCRIPTION OF PREFERRED EMBODIMENTS

Figure 1:
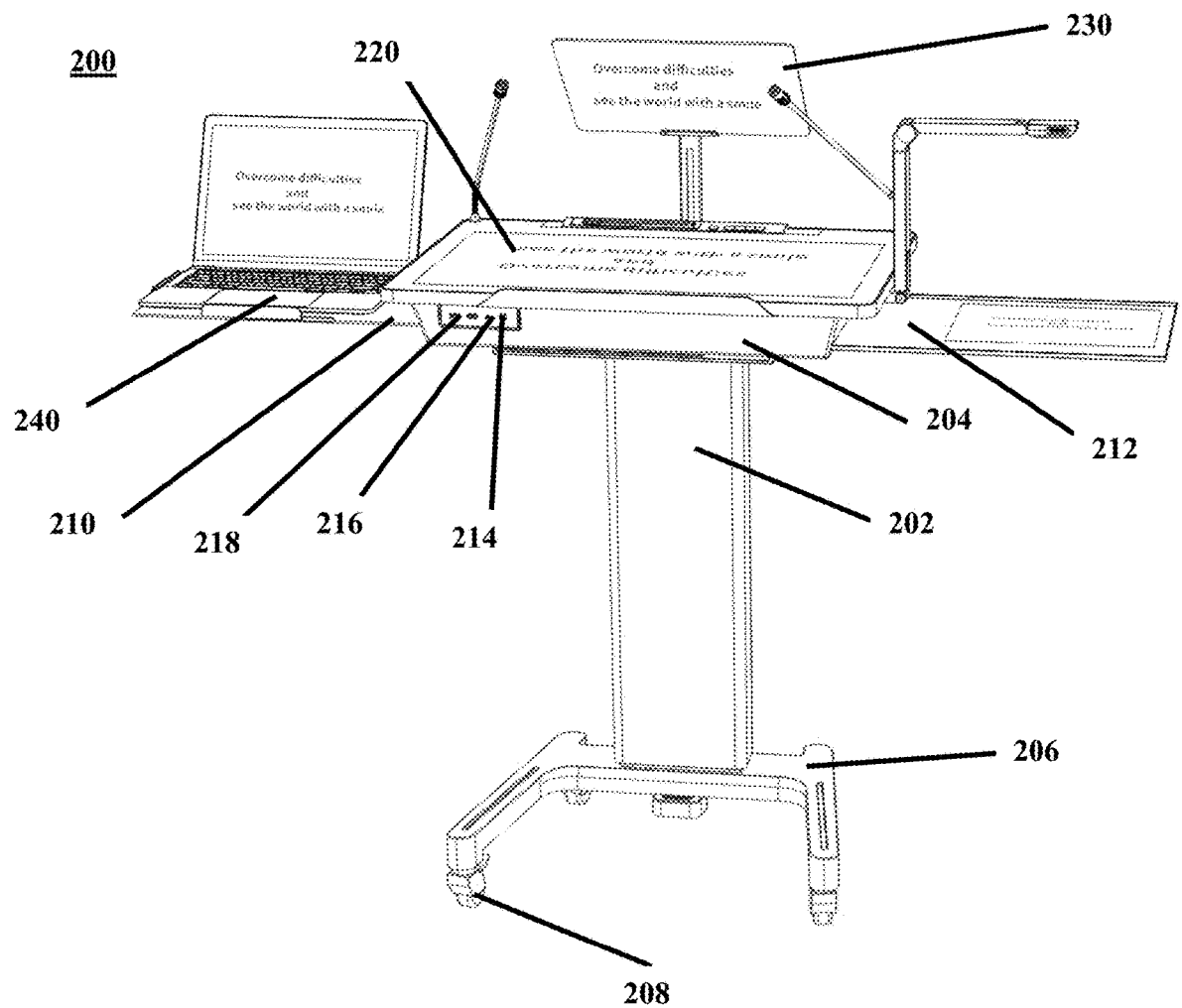
FIG. 1 illustrates a digital teaching station with a central interactive flat-panel display screen according to an embodiment of the invention.

Preferred embodiments of the present invention and their advantages may be understood by referring to FIGS. 1-6, wherein like reference numerals refer to like elements. The described features, structures, or characteristics of the invention may be combined in any suitable manner in one or more embodiments. It will be apparent to those skilled in the art that various modifications and variations can be made to the present invention without departing from its spirit and scope. Thus, the current invention is intended to cover modifications and variations consistent with the scope of the appended claims and their equivalents.

The present invention employs a digital teaching station with a central interactive flat-panel display, as disclosed in U.S. patent application Ser. No. 16/451,000, entitled "Digital Teaching Station," the entire disclosure of which is incorporated by reference herein.

The present invention advances the utility of teaching stations. It provides a fully modular digital teaching station that creates an interconnection between wired or wirelessly connected devices while acting as a multi-directional switch handling new and advanced data types. The modular characteristics and inclusion of ports and connectors on the digital teaching station allow an optional presidential teleprompter, a document camera, speakers, one or more microphones, a digital whiteboard, a personal computer, and other devices not limited to various electronic devices, the identification of which are apparent to one of ordinary skill in the art.

FIG. 1 illustrates a front view from a presenter perspective of a digital teaching station 200 according to an embodiment of the invention. The digital teaching station 200 comprises a central interactive flat-panel display screen 220, a platform 204, a stand 202, a base 206, and wheels 208. The central interactive flat-panel display screen 220 is housed or affixed on the platform 204, secured on the stand 202. The stand 202 and platform 204 may be made of one uniform piece or separate pieces to allow easy travel and transportation. The digital teaching station 200 comprises wheels 208 attached to the base 206 and stand 202. The central interactive flat-panel display screen 220 acts as an extended touch panel for externally connected laptops. It can be a 27-inch touch screen or another size, whether larger or smaller. In an embodiment, the central interactive flat-panel display screen 220 runs at 60 Ghz WiHD or faster to communicate to a connected computing device. The central interactive flat-panel display screen 220 is not limited to be 27 inches but can be larger, ranging from 27 inches to 40 inches. In addition, the detachable interactive flat-panel display 220 sends a video stream to a larger second display screen that an audience views. If a computing device 240 is connected and the detachable interactive flat-panel display 220 is mirroring the computing device's display, the larger display screen shows the mirrored stream or a different display screen. A user has the preference to choose what video stream is displayed on the larger display screen.

The central interactive flat-panel display screen 220 is preferably, but not limited to be upward facing. The digital teaching station 200 comprises at least a first side tray 210 that extends and slides out from the platform 204 on one side of the digital teaching station 200. In addition, at least a second side tray 212 opens and slides out from the platform 204 on the opposite side of the first side tray 210. The present embodiment shows two trays 210 and 212. However, there may be slidable and extendable trays on the digital teaching station 200. A computing device 240 rests on either side tray 210 and 212. The side trays 210 and 212 charge a computing device 240 via a QI charging pad or other wireless charging technologies. The side trays 210 and 212 also act as a dock to a computing device 240. The computing device 240 connects and attaches to the central interactive flat-panel display screen 220 to serve as the control device to work the digital teaching station 200. The computing device 240 is shown as being connected to one side. Still, it can be connected to the digital teaching station at any location, including being enclosed by the digital teaching station 200. The computing device 240 can be selected from a non-limiting group, including a tablet, laptop, document camera, iPad, Android, iPhone, or any other telecommunication device, etc.

Additionally, the computing device 240 connects to the digital teaching station 200 via a wireless communications protocol, the identification and implementation of which are apparent to one of ordinary skill in the art. The digital teaching station 200 comprises a video input port 214 and a video output port 216 encompassing the platform 204. Circuitry accepts video input signals and video output signals from a computing device 240, the central interactive flat-panel display screen 220 itself, or other devices that are connected. An assortment of ports 214 and 216 are not limited to the select video input and output ports shown in an embodiment.

The central interactive flat-panel display screen 220 employs a computer that runs any operating system, including Android, Linux, or Windows. The platform 204 has a set of industry-standard protocol compliant drivers 218 such as Universal Serial Bus ("USB") Video Class driver ("UVC"), User Account Control ("UAC"), Mobile Switching Center ("UMSC), Human Interface Devices ("HID"), or other drivers. Drivers 218 are dynamically updated as more protocol becomes available or current protocol updates occur. The platform 204 has an assortment of connectors such as USB 2.0, USB 3.0, or Type A, B, or C connectors 218. Additionally, the central interactive flat-panel display screen 220 identifies protocol metadata from connectors 218. The central interactive flat-panel display screen 220 determines in real-time whether the user intends to treat the data or signal as input-output. Therefore, by including an assortment of USB connectors 218 and updated ports 214 and 216, the digital teaching station 200 supports new data content forms.

Figure 2:
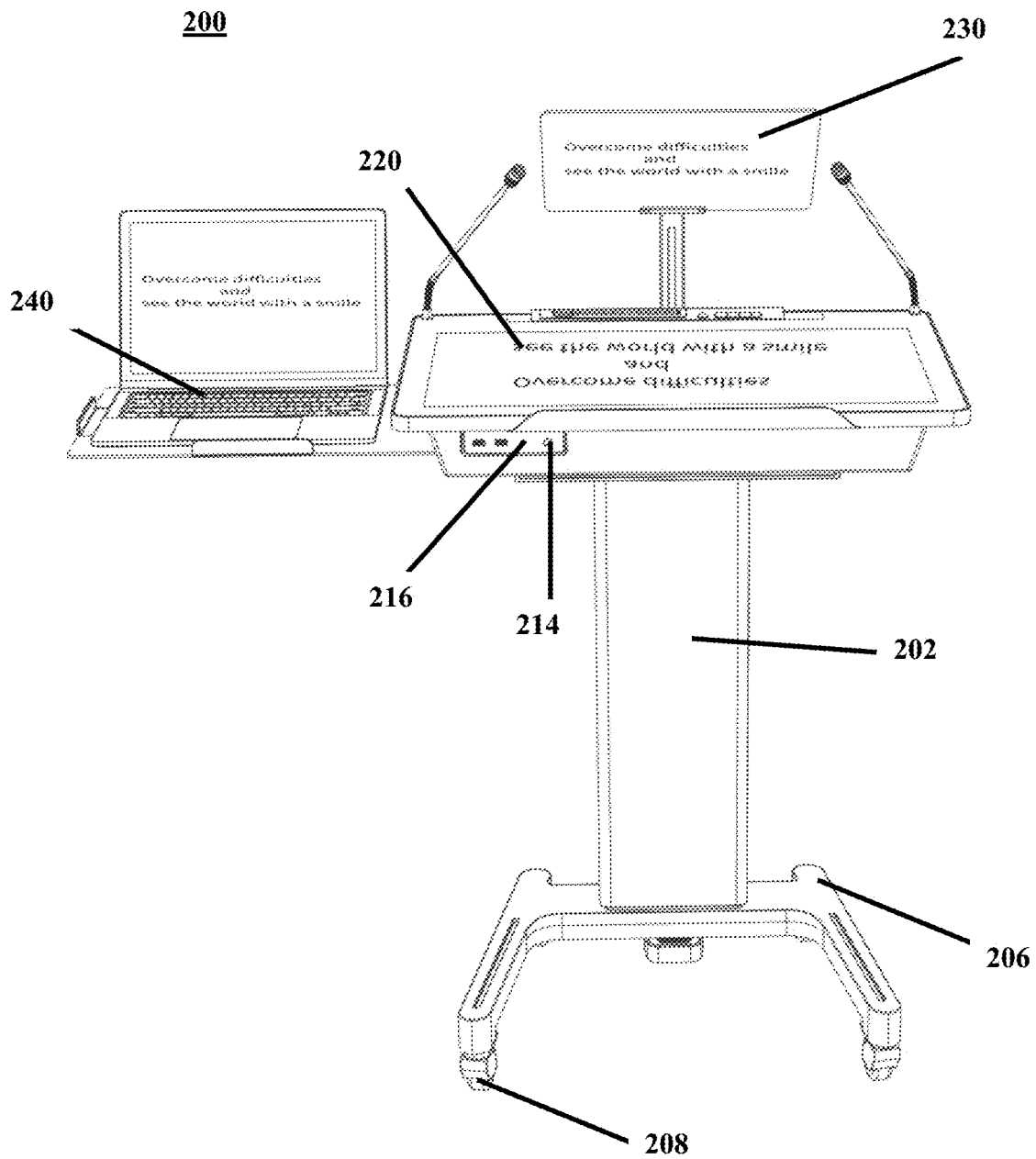
FIG. 2 illustrates a digital teaching station with a central interactive flat-panel display screen and a corresponding computing device according to an embodiment of the invention.

FIG. 2, illustrates a digital teaching station 200 with a side tray 212 not extended, an optional computing device 240 connected, and an optional teleprompter system connected by a reflective glass mirror 230. The digital teaching station comprises a reflective glass mirror 230 to create a teleprompter system using the central interactive flat-panel display screen 220. The optional reflective glass mirror 230 is preferably, but not limited to, being mounted at a 45-degree angle for optimal reflectiveness and mounted nearing an audience. The reflective glass mirror 230 can be made of beam splitter material, beam splitter glass, or any other material to allow semi-transparency and perfect reflection. Additionally, the reflective glass mirror 230 can have an anti-reflective coating on the backside to prevent double images. The central interactive flat-panel display screen 220 displays a manipulated image. Simultaneously, the video output of the digital teaching station 200, specifically the video stream from the video output port 214, emits an always upright or non-manipulated image because of the switching capabilities of the central interactive flat-panel display screen 220. A computing device 240 runs a teleprompter-specific image manipulation software application to enable the teleprompter system. In an embodiment of the invention, video output signals are produced from the central interactive flat-panel display screen 220 or relayed from the external computing device 240 plugged into the video input port 214.

In an embodiment of the invention, the central interactive flat-panel display screen 220 and the reflective glass mirror 230 are height adjustable. The reflective glass mirror 230 reflects the entire surface of the central interactive flat-panel display screen 220 and displays the reflected image at a speaker's eye level.

Figure 3:
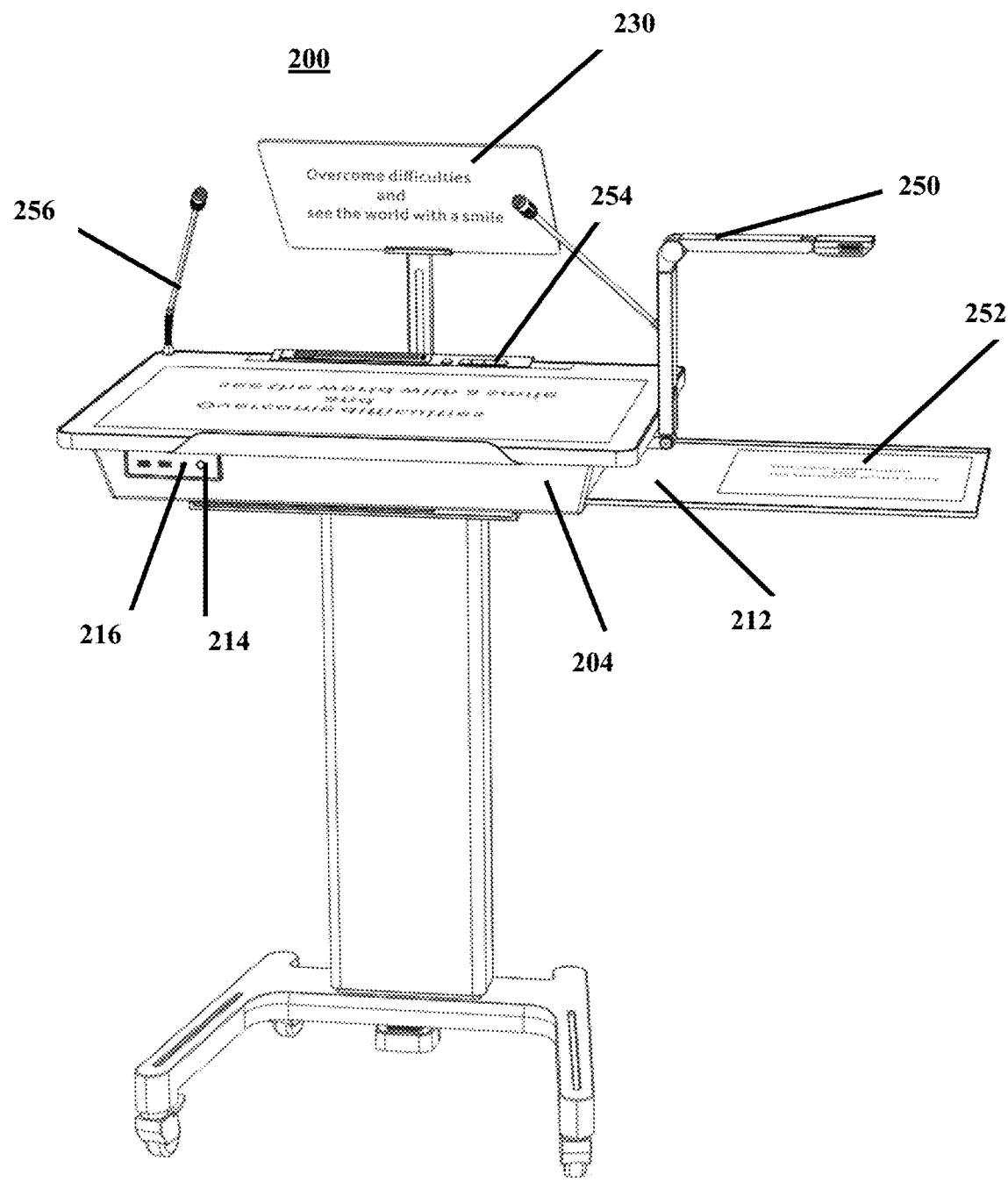
FIG. 3 illustrates a digital teaching station with a central interactive flat-panel display screen and a document camera according to an embodiment of the invention.

FIG. 3 illustrates a digital teaching station 200 with a side tray 210 not extended, a document camera 250 connected while a tray 212 is opened, a whiteboard 252, and microphones 256. The digital teaching station 200 can enclose or accept an attachable document camera 250. The document camera 250 captures images from above the extended tray 212, where a document is provided. The document camera 250, also referred to as a visual presenter, visualizer, digital overhead, or docucam, can be attached to the present embodiment to capture real-time images.

Further, a user can enable the document camera 250 using a button or other enabling device or instrument 254 housed by the platform 204 on the digital teaching station. The document camera 250 displays and streams to a screen a paper document but could show any object that a speaker wants to display. Optionally, a whiteboard 252 is be affixed to the tray 212, which is captured by the document camera 250 and streamed.

The document camera 250 captures an upright video image of any content laid down on the side tray 212 or whiteboard 252. The document camera 250 uses software to display a video stream. The video stream connects to the central interactive flat panel display screen 220 or another display device, such as a projection display screen where it is displayed. The same software performs similar content manipulation to display an upside-down mirror image on the central interactive flat panel-display screen 220 or another display screen. Additionally, the video input port 214 and video output port 216 provide a separate video stream to the central interactive flat panel-display screen 220 while maintaining upward-facing content from the document camera 250. Because of the ports and software creating an upside-down mirror image on the central interactive flat panel-display screen 220, a reflective glass mirror 230 shows an upright image on the reflective glass mirror 230 to a speaker. Concurrently, the audience sees an upright image of the content on a different screen if desired. In an embodiment, the digital teaching station 200 comprises a microphone 256, amplification device, or the like to amplify sound.

The digital teaching station 200 comprises an enabling button 254 that powers the reflective glass mirror 230 and a central interactive flat-panel display screen 220. Thereby turning on a teleprompter system. A button 254 is shown in an embodiment, but any device or instrument enables the digital teaching station's electronic features or power functions. A speaker chooses what is displayed by strategically pressing the button 254 to signal the start of a teleprompter software application installed on a computing device 240. The software application manipulates a selected image to create an upside-down mirror image of the original content displayed on the central interactive flat-panel display screen 220.

Figure 4:
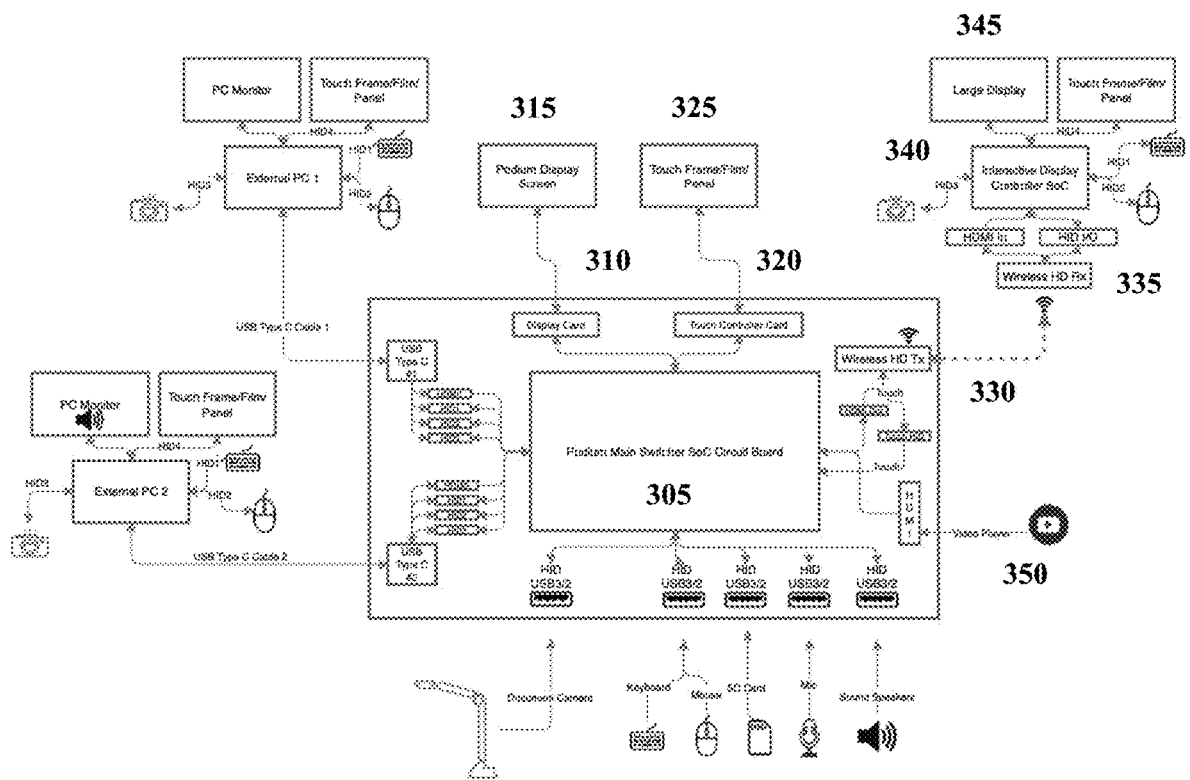
FIG. 4 is a circuit diagram corresponding to a digital teaching station and central interactive flat-panel display screen according to an embodiment of the invention.

In accordance with FIG. 4, showing a circuit diagram 300, a digital teaching station 200 has the advantage of allowing an assortment of devices to be connected. The central interactive flat-panel display screen 220 comprises a podium main switcher circuit board 305 to control all interactions between connected devices. The podium main switcher circuit board 305 comprises a display card 310 that sends content to a podium display screen 315 and a touch controller card 320 connected to a touch frame or film panel 325. Furthermore, the podium main switcher circuit board 305 houses HDMI, HID, and USB ports that connect to external computing devices. The podium main switcher circuit board 305 also encompasses a wireless HD transmitter 330 that communicates to a wireless HD receiver 335 on an interactive display controller 340. The interactive display controller 340 switches on a large display 345 device. In addition, the podium main switcher circuit board 305 provides an HDMI port to use a video player application 350.

The digital teaching station 200 and central interactive flat-panel display screen 220 launch and run application software that accesses digital input content such as a USB video class stream. Then, additional processing at the application level is performed. In an embodiment, on the central interactive flat-panel display screen 220, a UVC stream is displayed in a whiteboard application. A user performs annotations, dynamically enhances images over an active stream, adds effects, performs rotations, scales, zooms, and crops. For an incoming 3D Virtual Reality Modeling Language ("VRML") data stream scene, a user performs 3D rotations of the objects, rotates, zooms, selects, deletes, copies, adds, annotates, and performs other functions.

In FIG. 4, a central interactive flat-panel display screen 220 has external terminal devices connected. The central interactive flat-panel display screen 220 identifies what a user intends through a Graphical User Interface ("GUI") that distinguishes between source, destination and determines an optimal route of redistribution or routing path accordingly. The central interactive flat-panel display screen 220 provides connections to other devices selected from a non-limiting group, including laptops, PCs, USB connected cameras, wireless remote cameras, interactive whiteboards, interactive flat panel displays, monitors, mobile phones, tablet computers, mouse, keyboard, other human-machine interface devices, thumb drives, SD cards, microphones, speakers, WiFi or Bluetooth connected devices, or any particular purpose devices with any other applications either through the use of wires or wirelessly. Further, the wireless connectivity allows the digital teaching station 200 to manage wireless signals and act as a bridge/switcher to aggregate devices wirelessly.

The digital teaching station 200 and central interactive flat-panel display screen 220 accept a plurality of input data and signals, including traditional audio and video data and smart terminal digital content streams such as UVC, UAC, and HID data. The central interactive flat-panel display screen 220 accepts user input events through the GUI to determine the source device and its destination. There can be a plurality of destination devices. In an embodiment, a mouse pointer or like device is attached to the digital teaching station 200 acting as an input device, where coordinate data can be transmitted using an HID protocol to an externally linked laptop 240 and a large display panel or projector at the same time. Thus, accepting all input data varieties and signals is preferred, so no content types will have to be excluded, and the user can control the system with great flexibility.

The digital teaching station 200 and central interactive flat-panel display screen 220 can comprise a multitouch screen running a GUI that accepts user inputs such as touching the screen with one or more fingers, mouse pointer events, keyboard events, voice input, gesture recognition events, or other actions. The digital teaching station 200 is customizable to include a dedicated media hub with audio, video, and speakers.

Figure 5:
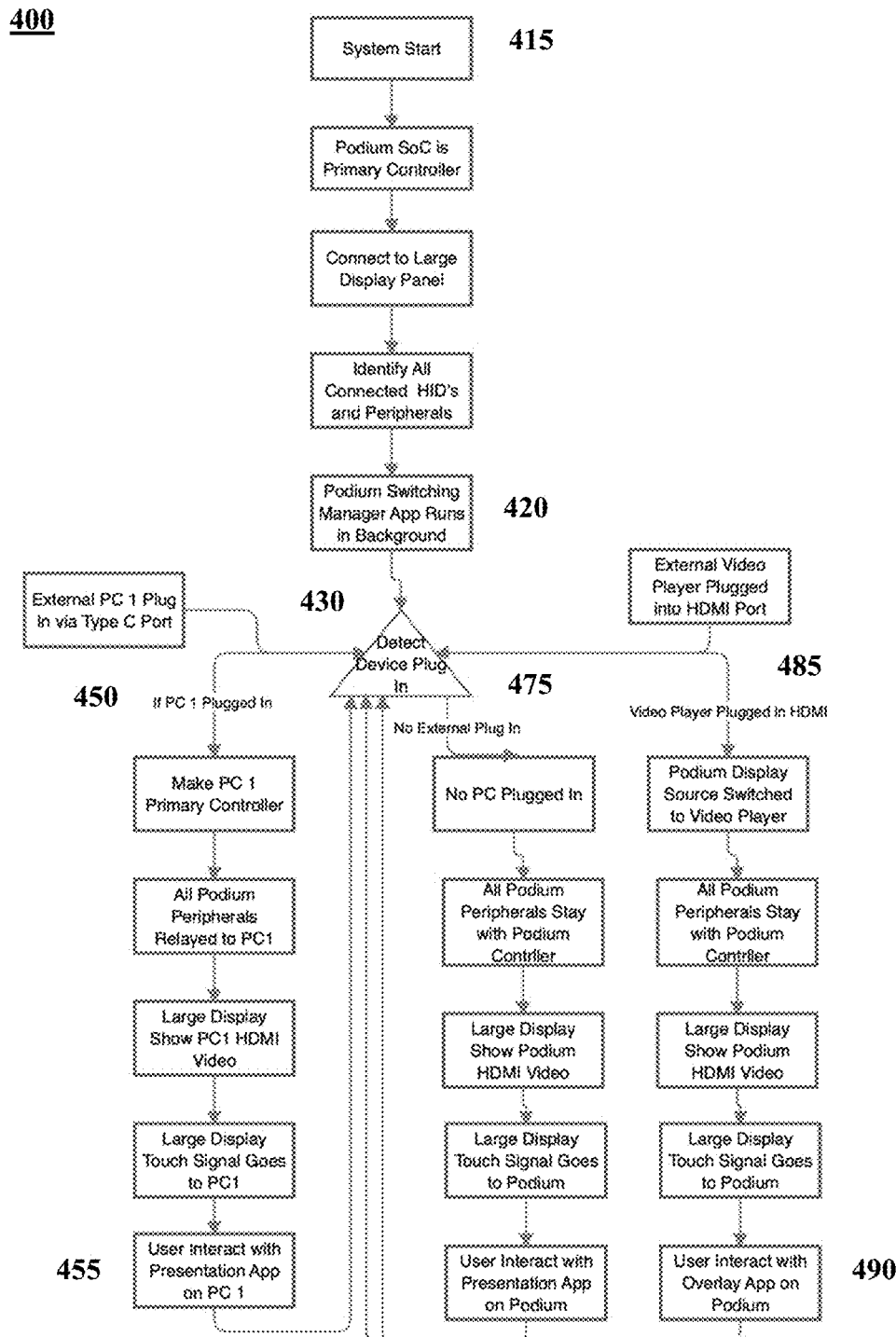
FIG. 5 is a flow chart showing a switching logic of a digital teaching station and central interactive flat-panel display screen according to an embodiment of the invention.

FIG. 5 illustrates a flow chart of the digital teaching station's 200 and central interactive flat-panel display screen's 220 switching logic 400. The switching logic shows multiple terminal devices connected and generating data over USB interfaces—moreover, the signals/data exchange in a bi-directional manner. The switching logic 400 is initiated by a starting process 415, where the podium main switcher circuit board 305 is the primary controller. As a primary controller, it starts the system, connects to a large display panel, and identifies all connected HID's and peripheral devices. Meanwhile, a podium switching manager application 420 runs in the background. A detection module 430 determines all devices connected, whether wirelessly or wired. The switching logic 400 has multiple modules that perform functions. The switching logic 400 follows determined routes if devices are connected. For example, if a computing device 240 is connected, logic path 450 is followed, where the computing device 240 is the primary controller. All podium peripherals are relayed to the computing device 240, and a large display shows the computing device's screen through an HDMI video port. A user also interacts with a presentation application 455 to control the device interactions.

Furthermore, when no computing device is connected, the switching logic 400 follows path 475, where all podium peripherals stay within the podium controller. A user interacts only within the presentation application 455. Finally, when a video player is plugged in the HDMI port, path 485 is followed to switch the podium display source to the video player. All podium peripherals stay with the podium controller, and a large display screen shows the podium HDMI video stream. A user interacts with the system on an overlay application 490 on the podium.

The central interactive flat-panel display screen 220 captures a user's touch HID events based on user motions and touch inputs. Touch events are displayed on a large Interactive Flat-Panel Display ("IFPD") that is shared with a laptop connected via a USB cable to the platform 204. Additionally, other smart terminal devices wirelessly are connected to the digital teaching station 200. An intelligent terminal device subsequently performs response processing based on touch events. Mouse and keyboard events inputted on a computing device 240 or a wireless smart device are transmitted by the central interactive flat-panel display screen 220 to the IFPD. A response event is triggered on the IFPD.

Consequently, according to FIG. 5, a software application manipulates a selected image to create an upside-down mirror image displayed on the central interactive flat-panel display screen 220. The software application can also be referred to as a local computer program product that is installed onto the digital teaching station 200. The video stream from the video output port 214 may not display an upside-down image. The switching capabilities display a separate video stream from the software application to keep the content upright. Therefore, the audience views an upright image on any other displays, such as but not limited to a projection screen or flat panel display. A reflective glass mirror 230 is mounted, and due to the optical arrangement of the glass, a speaker reads the upright image on the mirror 230 while maintaining eye contact with an audience. The speaker views an upright image of the central interactive flat-panel display screen 220 by looking forward into the reflective glass mirror 230 without looking down or away.

Figure 6:
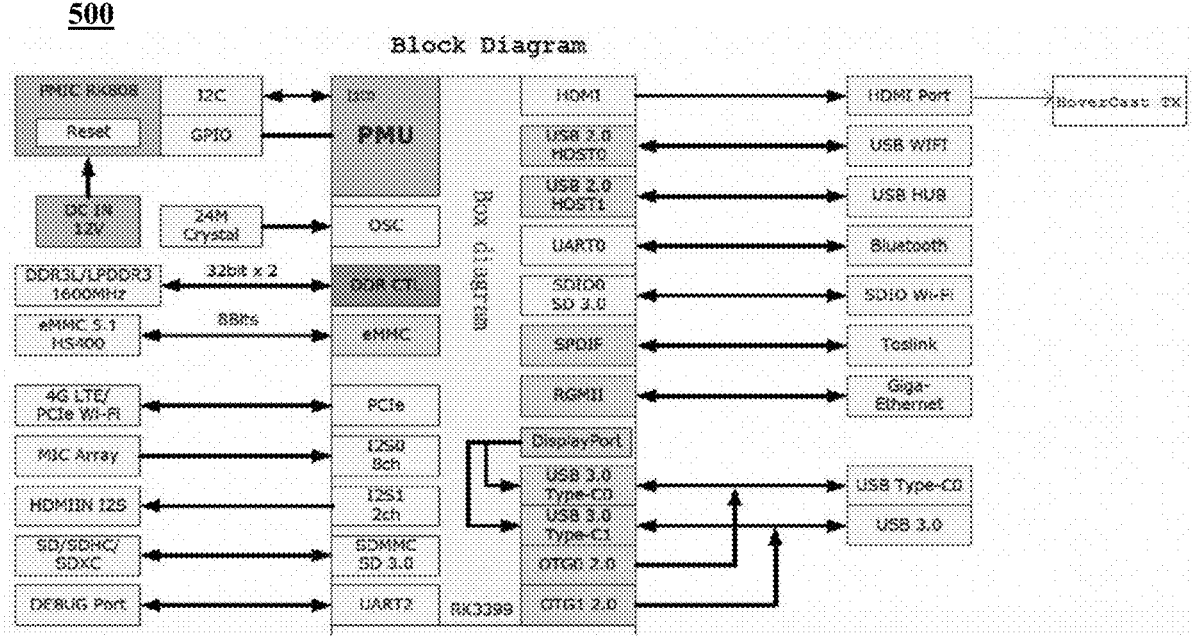
FIG. 6 is a block diagram showing the connectivity of a digital teaching station and a central interactive flat-panel display screen according to an embodiment of the invention.

FIG. 6 illustrates a block diagram 500 showing the connectivity of the digital teaching station 200 and central interactive flat-panel display screen 220. The central interactive flat-panel display screen 220 allows a computing device 240 to control the entire system. Individual outputs from source devices are redirected to the intended destination when other terminal devices act as an input. Input data types are typically a mouse, keyboard, multitouch screen, audio, and video data transmitted over USB physical interfaces. The USB interfaces follow standard protocols such as HID, UVC, UAC, UMSC, or other data types. Such data exchange occurs bi-directionally from one terminal device to another terminal device—switching or reversing the process from one device to another. A user thus controls the digital teaching station 200 and a presentation through the central interactive flat-panel display screen 220 itself, a personal computing device 240, or other similar devices.

The central interactive flat-panel display screen 220 accepts external devices connected wirelessly or using wires. The central interactive flat-panel display screen 220 parses or understands the input source device's protocol input data. The central interactive flat-panel display screen 220 performs a repackaging of any metadata and uses driver software to create USB packets before sending them to a destination device. The central interactive flat-panel display screen 220 device's hardware and software transcode the USB input data. In an embodiment of the invention, the device is powered by Snapdragon 8CX/7CX and runs Windows IO/Android 10.1.

While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

I claim:

1. A digital teaching station comprising:
a stand mounted on a base;
a platform affixed on the stand, wherein the platform comprises a plurality of ports connecting a plurality of peripheral devices, a first side tray, and a second side tray; and
a detachable multitouch flat-panel display screen disposed on the platform comprising a Graphical User Interface and a main switcher circuit board comprising:
a display card, a touch controller card, and a switching logic following determined routes of the main switcher circuit board.

2. The device of claim 1, wherein the detachable multitouch flat-panel display screen is capable of connecting to a computing device and mirrors content displayed on the computing device.

3. The device of claim 2, wherein the detachable multitouch flat-panel display screen is capable of sending a video stream to a second display screen.

4. The digital teaching station of claim 1, wherein the stand is height adjustable.

5. The digital teaching station of claim 4, wherein the platform further comprises a plurality of ports selected from the group consisting of a video input port, a video output port, an HDMI port, and a USB C port.

6. The digital teaching station of claim 5, wherein the platform further comprises a document camera.

7. The digital teaching station of claim 6, wherein the first side tray comprises a whiteboard underneath the document camera.

8. The digital teaching station of claim 1, wherein the platform comprises a glass mirror affixed on the stand.

9. The digital teaching station of claim 1, wherein the platform further comprises a microphone.

10. The digital teaching station of claim 1, wherein the first side tray charges a computing device.

11. The digital teaching station of claim 1, wherein the platform further comprises a speaker.

12. The digital teaching station of claim 1, wherein the base further comprises a plurality of wheels.

13. A digital teaching station apparatus for switching data signals comprising:
a stand mounted on a base;
a platform affixed on the stand, wherein the platform comprises a plurality of ports connecting a plurality of peripheral devices, a first side tray, and a second side tray; and
a detachable multitouch flat-panel display screen disposed on the platform comprising a Graphical user Interface and a main switcher circuit board comprising:
a display card, a touch controller card, an HDMI video player, and a wireless HD transmitter.

14. The apparatus of claim 13, wherein the central multitouch flat-panel display screen is capable of distributing a content type selected from the group consisting of HID events, UVC video streams, UAC audio streams, and USB Mass Storage Class File exchanges.

15. The apparatus of claim 13, wherein the main switcher circuit board distributes a signal in a multi-directional manner.

16. The apparatus of claim 13, further comprising an input connector and an output connector, wherein the input and output connectors are selected from the group consisting of an HDMI connector, an S-video connector, an optical port, an auxiliary input, a component video connector, a component audio connector, a composite video connector, an audio headphone jack, a XLR microphone connector, a USB 2.0, a USB 3.0, and a USB Type C connector.

17. The apparatus of claim 13, wherein the central multitouch flat-panel display screen is capable of connecting to a special purpose device selected from the group consisting of an interactive flat panel and an interactive whiteboard.

18. The apparatus of claim 13, wherein the central multitouch flat-panel display screen is capable of accepting and connecting to a computing device;
identifies all connected HID devices and peripheral devices; and
switches between all devices in a multi-directional manner.

* * * * *